United States Patent [19]
Green

[11] 3,965,566
[45] June 29, 1976

[54] METHOD OF INSTALLING DETACHABLE SUN ROOF PANEL FOR AUTOMOBILES

[75] Inventor: Hal Green, Southfield, Mich.

[73] Assignee: Empire Automotive, Inc., Ferndale, Mich.

[22] Filed: May 27, 1975

[21] Appl. No.: 580,987

Related U.S. Application Data

[62] Division of Ser. No. 444,274, Feb. 21, 1974, Pat. No. 3,913,971.

[52] U.S. Cl. ................................. 29/451; 29/526
[51] Int. Cl.² ......................................... B23P 11/02
[58] Field of Search ............ 29/428, 451, 526, 445; 49/504, 485, 465; 292/DIG. 30; 296/137 R, 137 A, 137 B

[56] References Cited
UNITED STATES PATENTS

| | | |
|---|---|---|
| 2,665,459 | 1/1954 | Lee ........................ 49/485 |
| 3,016,263 | 1/1962 | Rehmann ................... 296/137 E |
| 3,068,939 | 12/1962 | Commisso ................... 29/451 UX |
| 3,163,702 | 12/1964 | Warhol ...................... 29/451 UX |
| 3,293,738 | 12/1966 | Caldwell et al. ............. 29/451 |
| 3,488,828 | 1/1970 | Gallagher .................... 29/451 |
| 3,610,681 | 10/1971 | Trenkler ..................... 49/465 X |

*Primary Examiner*—Charlie T. Moon
*Attorney, Agent, or Firm*—Krass and Young

[57] ABSTRACT

A detachable sun panel for the roof of an automobile consists of a transparent panel adapted to be supported on a resilient molding extending around the perimeter of an aperture formed in the roof. The molding is adapted to be installed in a hole cut in a conventional roof and engages the sheet metal of the roof as well as the underlying headliner. The panel carries a pair of extensions on one end which engage the underside of the molding and a pair of latches on the opposite side which may be moved into a closed position to lock the panel against the molding.

3 Claims, 7 Drawing Figures

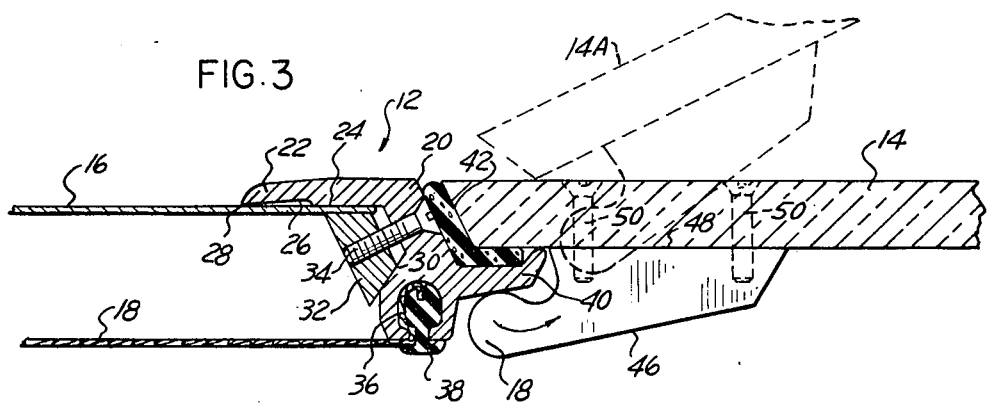
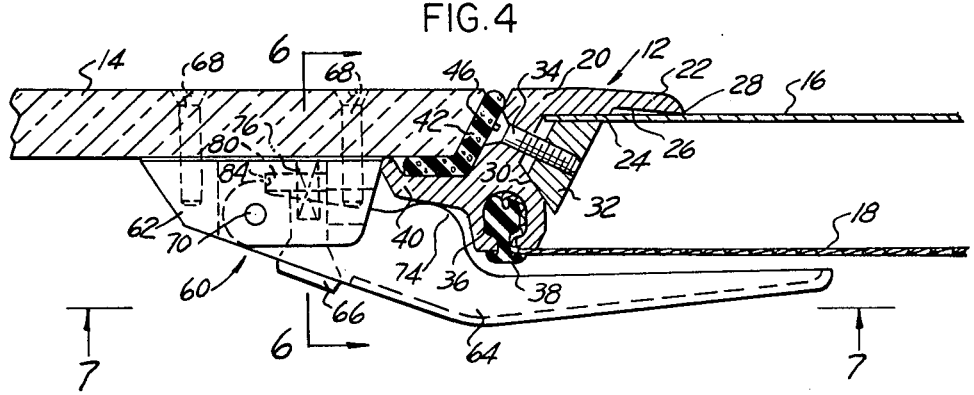

METHOD OF INSTALLING DETACHABLE SUN ROOF PANEL FOR AUTOMOBILES

This is a division of application Ser. No. 444,274, filed Feb. 21, 1974, now U.S. Pat. No. 3,913,971.

BACKGROUND OF THE INVENTION

1. Field of the Invention

This invention relates to a detachable sun roof panel adapted to be secured to the roof of an automobile as well as to a method of converting roofs of conventional vehicles to receive such panels.

2. Prior Art

Sun roof arrangements for controllably opening a hole in a vehicle roof for ventilation purposes during good weather conditions have typically employed a panel slidable along guides formed in the vehicle roof between open and closed positions. These sun roof arrangements are popular and solve the problem of storing the panel when the sun roof is open, but are expensive when incorporated in the vehicle during its manufacture and the process of converting existing vehicles to accept them is quite complicated. Certain automobiles are manufactured with entire roof sections detachably supported on pillars above the vehicle body so that they may be removed in the manner of a sun roof. These detachable roofs generally employ latch members fixed to the vehicle which may be actuated to secure the roof in place. It would be totally impractical to convert a conventional automobile to the form of one of these removable roof arrangements.

SUMMARY OF THE INVENTION

The present invention is directed toward a sun roof panel which may be supported in an aperture formed centrally within a conventional vehicle roof and may easily be unlocked and removed to open the aperture. The nature of the stucture for supporting the panel in the aperture and locking it in place are such that they may be easily applied to existing automobile roofs in the field, as opposed to being installed as original equipment during the manufacture of the vehicle. The present invention is also addressed to the method of installing the sun roof panel supporting structure in a conventional automobile roof.

The sun panel of the present invention is characterized by the fact that all of the locking mechanism for retaining the panel in the roof aperture is affixed to the panel itself. This greatly simplifies the problem of installing the sun roof in existing vehicles since the addition to the vehicles simply consists of forming a central aperture in the roof and installing a molding around the interior perimeter of the aperture. The molding is adapted to engage the sheet metal of the roof to firmly retain the molding in sealed engagement with the roof and is further adapted to receive the fabric headliner which conventionally is formed beneath the roof panel to give the installation a finished appearance from the interior of the vehicle.

The molding has a tapered pocket which allows it to be readily secured to the sheet metal of the roof through use of wedge shaped blocks which are drawn into the tapered pocket by threaded fasteners and secure the sheet metal between the wedge and the molding.

The process of converting an existing vehicle to receive the sun roof first involves forming a central hole of proper dimensions in the vehicle roof. The molding is then applied to the perimeter of the aperture by securing the edges of the sheet metal of the roof between the interior tapered section of the molding and the wedges. The edges of the fabric headliner are then tucked into a groove formed on the molding and secured therein by a retaining molding which is pressed into the groove. The panel may then be inserted into the seat provided by the molding and secured by the clamps.

In the preferred embodiment of the invention the panel is formed of a transparent plastic so that when in place it fully seals the opening in the vheicle roof but allows light to enter.

The panel engaging section of the molding substantially comprises an elastomeric strip having a horizontally projecting upwardly facing surface and an adjoining vertical surface directed inwardly toward the aperture. These surfaces are adapted to mate against the bottom and side edges of the sun roof panel to firmly seal the panel in the aperture.

The fastener mechanism for securing the panel within the aperture preferably includes at least a pair of bayonetlike extensions affixed to the underside of a panel at one end and adapted to abut the underside of the aperture molding when the panel is in place to thereby cooperate with the associated forward edge of the panel and lock that edge of the panel against upward movement. The opposite end of the panel is equipped with at least a pair of locking handles pivotably supported at spaced points on the lower edge of the panel. These handles have cam surfaces which engage spring loaded locking buttons. When the edges of the panel are aligned with the resilient section of the molding the locking handles may be moved to a closed position wherein they extend beneath the adjacent section of the molding. The locking buttons engage detent sections on the cam surfaces to retain the handles in a locked position. To release the handles and allow removal of the panel, the locking buttons are pressed against their spring bias, moving them out of engagement with the detent section.

Other objectives, advantages and applications of the present invention will be made apparent by the following detailed description of a preferred embodiment of the invention. The description makes reference to the accompanying drawings in which:

FIG. 3 is a sectional view through the vehicle roof and the sun roof panel through the bayonet area, taken along line 3—3 of FIG. 2;

FIG. 4 is a sectional view through the roof and panel taken through a closed handle member along lines 4—4 of FIG. 2;

FIG. 5 is a sectional view similar to that of FIG. 4 with the handle in an opened position;

FIG. 6 is a sectional view through the handle release button taken along line 6—6 of FIG. 4; and FIG. 7 is a view of a closed handle taken along line 7—7 of FIG. 4.

While the sun roof of the present invention may be installed in such varied vehicles as trucks, mobile homes and recreational vehicles of all types which require ventilation on a demand basis, the preferred embodiment is illustrated as being applied to an automobile, generally indicated at 10. Broadly, a rectangular opening in the roof of the vehicle is equipped with a perimeter frame 12 and a flat panel 14 is adapted to be removably affixed within the frame 12.

Figure 1:
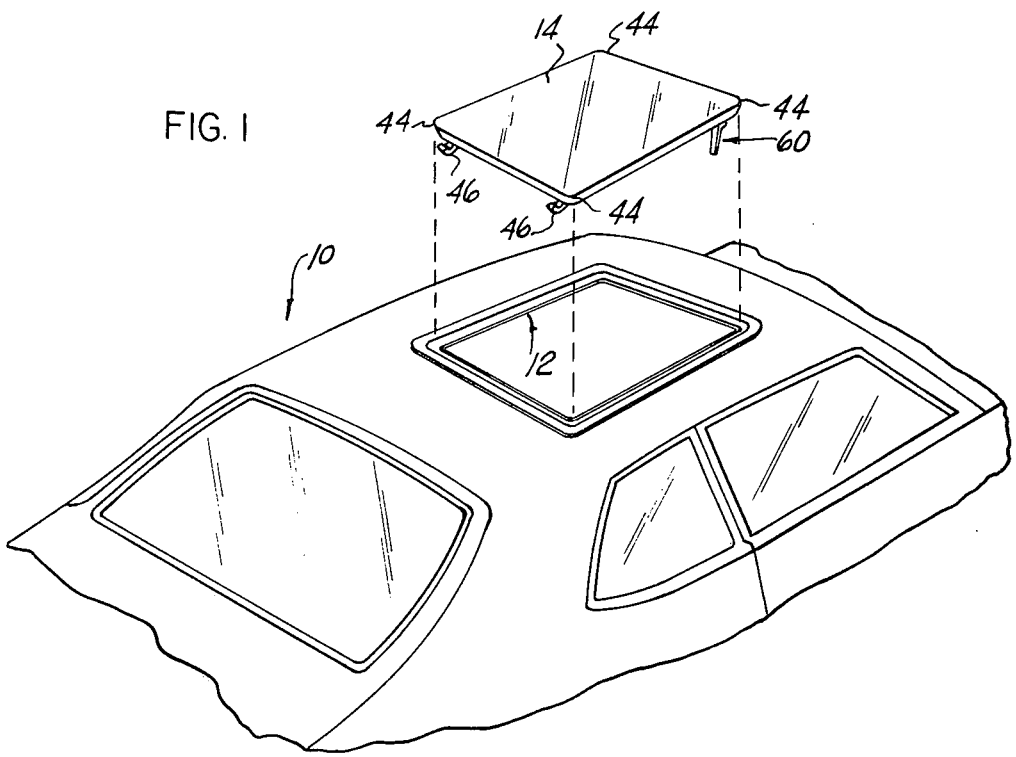
FIG. 1 is a perspective view of the roof of an automobile having a sun roof opening equipped with a frame formed in accordance with the present invention and adapted to receive a sun roof panel.
Figure 2:
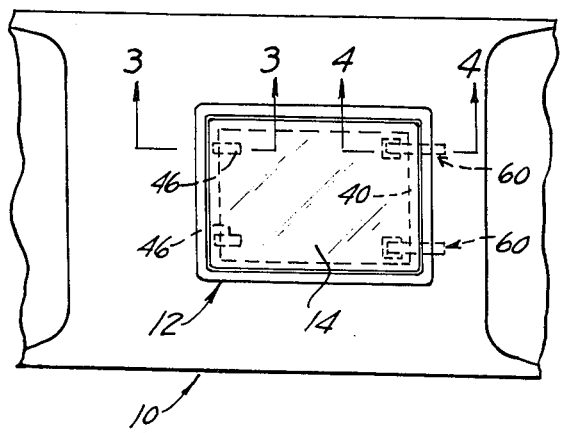
FIG. 2 is a plan view of the roof section with the sun roof section in place.

As shown in FIGS. 3, 4 and 5, a typical automobile roof, viewed in cross section, consists of a rigid sheet metal or plastic shell 16 and a flexible sheet headliner 18 slightly spaced from the underside of the shell 16. To equip a conventional automobile roof to receive a sun panel 14 a hole of an appropriate size is first formed in the roof shell 16 and a slightly smaller hole is formed in the headliner 18. The holes are preferably rectangular with rounded corners. While the hole shown in FIG. 1 has its principal axis extending longitudinally of the roof, it may equally well extend laterally. In fact, the hole, as well as the panel 14, need not be rectangular but may be of any arbitrary shape.

The frame 12 which is applied to the perimeter of the hole preferably employs an extruded aluminum molding 20. The molding includes a first section 22 which overlays the edges of the roof shell 16 adjacent to the hole. A flat surface 24 on the lower side of the first section 22 immediately abuts the roof shell edge. An upwardly relieved area 26 has an inclined surface which terminates in an end 28 that normally extends slightly below the line through the projections of the flat surface 24. Thus, when the surface 24 is brought into abutment with the roof shell 16, the edge 28 is pressed against the roof shell and may actually slightly bite into the shell, providing a good seal between the frame and the roof. During installation a bead of adhesive sealer is preferably inserted in the relieved area 26 to improve the seal.

A second section of the molding comprises an angled wall 30 formed below section 24, which makes an obtuse angle with that section to provide a tapered recess along the outer edge of the frame. The frame is affixed to the roof by locking the perimeter of the roof shell 16 between the surface 24 of the frame extrusion and a series of short wedge blocks 32 which have dimensions complementary to the tapered sections formed between the walls 24 and 30 of the frame. These wedge blocks are drawn into the tapered section, locking the frame to the roof by means of self-tapping screws with recessed heads 34 inserted through holes formed in the interior wall of the frame.

The second downwardly extending section of the frame has a groove 36 formed therein which is adapted to secure the free end of the headliner 18. The end is placed in the groove and a soft plastic trim strip 38 is inserted into the groove locking the free end of the headliner in place. The trim strip 38 has a head which fits against the outer side of the groove to allow it to be withdrawn. This head neatly finishes the interior of the frame.

The frame 20 also has a third section comprising an inwardly extending arm 40. A section of the flat elastomeric sealer strip 42 is adhered to the upper surface of the section 40 and the inclined upwardly extending interior surface of the main section of the frame, covering the recessed heads of the screws. A compressible strip 42 thus provides a horizontally extending surface backed up by the frame section 40 and an inclined upwardly extending surface backed by the main section of the frame.

The compressible section 42 acts to receive the sun roof panel 14. The panel is preferably formed of a transparent glass or plastic such as clear acrylic. It has rounded edges 44 and an inwardly and downwardly tapered edge 45 which matches the angle of the strip 42.

In the preferred embodiment of the invention one of the ends of the panel is fitted with fastener means consisting of a pair of bayonet sections 46 which may typically be formed of a hard plastic such as nylon. More than two bayonets may be employed and it is immaterial which edge of the panel 14 they are affixed to, but they should all extend in the same direction. The bayonets 46 include a flat surface 48 attached to the underside of the panel 14, slightly inwardly from the edge, by self-tapping screws with recessed heads 50 which pass through holes in the panel 14 through the upper side. Each bayonet 46 has a rounded nose section 49 that projects toward the free edge of the panel and is spaced from the panel. The upper surface of the nose 49 is rounded and hooked slightly upwardly. The vertical dimension between the upper edge of the nose 49 and the spaced lower surface of the panel 14 is slightly smaller than the uncompressed thickness of the frame section 40 and the overlying elastomeric surface 42.

The position of the panel 14 and the boyonet 46 when the panel is to be inserted into or removed from the frame is illustrated in FIG. 3 in phantom lines at 14a. The panel edge equipped with the bayonet is downwardly inclined toward the frame section. The free end of the frame section 40 is inserted in the space between the nose 49 and the edge of the panel 14 so that the edge and bottom of the panel 14 abut the two exposed surfaces of the seal 42 and the nose 49 of the bayonet abuts the underside of the frame section 40. Downward rotation of the opposite end of the panel, pivoting the panel toward the horizontal, acts to compress the seal 42.

The edge of the panel 14 opposite to that which carries the bayonet is equipped with one or more locking clamps, generally indicated at 60. The preferred embodiment of the invention is equipped with two of the clamps illustrated in cross section in FIGS. 4 and 5. The clamps generally consist of a hanger 62, a handle member 64 and a release button 66. All three parts are preferably formed of hard plastic. The hanger 62 is affixed to the underside of the panel 14, slightly inwardly from the edge opposite to that equipped with the bayonets 46, by a pair of self-tapping screws with recessed heads 68 which pass through holes in the panel from its upper side. The ends of a pin 80 are journaled in two sides of the hanger 62 and the center of the pin straddles a central cavity 72 in the hanger. The handle member 64 is pivotably supported on the pin 70 through a hole formed in one end of the handle.

The handle has a locking section 74 at one side which is adapted to press against the underside of the molding section 40, clamping that section and its overlying sealing strip 46 against the underside of the sun roof panel 14, as shown in FIG. 4. When the handle is pivoted to the open position, shown in FIG. 5, the panel 14 may be removed from the frame.

The release button 66 is supported for vertical movement within the hanger 62 and is urged downwardly by three springs 76 which abut a shim plate 78 at their upper ends. The shim plate is interposed between the hanger 62 and the panel 14. The button 66 has an extension 80 on its upper end which is urged against a cam surface 82 formed about the end of the handle 64 when the handle is in an open position. When the handle moves to a closed position, as shown in FIG. 4, the button rides off the end of the cam surface 82 into a detent area 84 formed on the handle and thereby locks the handle against rotational movement in an opening direction. In order to open the handle it is necessary to first press the exposed end of the button 66 upwardly, against the spring bias, until the push button clears the detent 84. When the handle is in the closed position the lower end of the disengagement button 66 projects through a hole formed in the web of the handle.

When locking section 74 is brought into contact with the section 40 of the frame during a locking action of the handle, it acts as a fulcrum and provides a mechanical advantage to forces exerted on the far end of the handle. This allows the sealing strip 42 to become compressed before the latch closes. The sealing strip acts to maintain a downward force on the handle when it is in its closed position to maintain tension on the system. The open handle 64 may be used to lift and carry the panel 14 to and from the storage area.

It is therefore seen that the frame 12 may be readily installed in an existing vehicle roof so as to make a solid sealed engagement with the roof and the construction of a panel and its attaching mechanism is extremely simple so as to be low in cost and reliable in operation.

Having thus described my invention, I claim:

1. The method of adapting a conventional vehicle roof having a hard outer shell and a flexible headliner formed beneath the shell, to receive a removable sun roof panel, comprising: cutting an aperture in the roof panel and the headliner; disposing an elongated molding having a tapered section and a groove around the perimeter of the aperture; securing the molding to the shell by affixing wedges to the molding at the tapered section so as to engage the roof shell between the molding and the wedges; and disposing the edge of the headliner in the molding groove and securing it therein with a strip which extends into the groove.

2. The method of claim 1 wherein the wedges are affixed to the molding by threaded fasteners which pass between the molding and the wedges.

3. The method of claim 1 wherein the molding includes a section adapted to overlie the edge of the roof shell, said section including a flat surface adapted to lie in abutment to the roof shell, an undercut area formed outwardly from the molding so as to be spaced from the roof shell and beyond the flat section, an end portion adapted to abut the shell so as to form a cavity for the reception of sealant in the undercut portion.

* * * * *